Feb. 2, 1965  A. B. GRÖNBERG  3,167,898
HARVESTERS

Filed Oct. 20, 1961  6 Sheets-Sheet 3

INVENTOR
Anton Bertil Grönberg
BY
Cushman, Darby & Cushman
Attorneys

Feb. 2, 1965  A. B. GRÖNBERG  3,167,898
HARVESTERS
Filed Oct. 20, 1961  6 Sheets-Sheet 4

INVENTOR
Anton Bertil Grönberg
BY
Cushman, Darby & Cushman
Attorneys

Feb. 2, 1965  A. B. GRÖNBERG  3,167,898
HARVESTERS

Filed Oct. 20, 1961  6 Sheets-Sheet 5

INVENTOR
Anton Bertil Grönberg
BY
Cushman, Darby & Cushman
Attorneys

Feb. 2, 1965 A. B. GRÖNBERG 3,167,898
HARVESTERS
Filed Oct. 20, 1961 6 Sheets-Sheet 6

INVENTOR
Anton Bertil Grönberg
BY
Cushman, Darby & Cushman
Attorneys

United States Patent Office 3,167,898
Patented Feb. 2, 1965

3,167,898
HARVESTERS
Anton Bertil Grönberg, Villa Karlsborg, Ottum, Sweden
Filed Oct. 20, 1961, Ser. No. 146,494
Claims priority, application Sweden, Oct. 21, 1960, 10,067/60
3 Claims. (Cl. 56—23)

This invention has reference to harvesters of the kind having a mower comprising a knife rod which is reciprocally movable in a horizontal plane and which has a row of knives for cooperation with stationary knives for mowing green fodder, corn and similar crop, a cutter for disintegrating the crop, and having a rotor acting as a conveyer fan for disintegration and conveyance of the mowed crop to the cutter. The main feature of the invention is to be seen in the arrangement of a rotated horizontal feeding screw behind the mower knife and above a feeder bottom, said screw feeding the crop mowed by said mower knife from the ends of the screw to its centre and rearwardly to the rotor. This arrangement of a wide mower and a special feeding screw involves the advantage of a considerable mowing or cutting width in spite of the rather small size of the harvester. The harvester can consequently be manufactured rather light and thus be used if necessary also on soft and even watery soil. When the crop consists of green fodder, this material will be crushed, broken and disintegrated in such a way that it is made suitable for being stored in a silo.

In a modification of the harvester according to the invention there is provided a flail-type mower and behind this mower is rotated an essentially horizontal feeding screw for feeding the mowed crop transversely to a conveyer fan. The fan conveys the material to the cutter which comprises a knife cutter and then further to a cyclone separator for weeding the crop.

The harvester according to the invention can be used in stationary work for weeding of corn and similar material.

An example of a harvester in accordance with the invention will now be described with reference to the accompanying partly diagrammatic drawings, in which.

Figure 1:
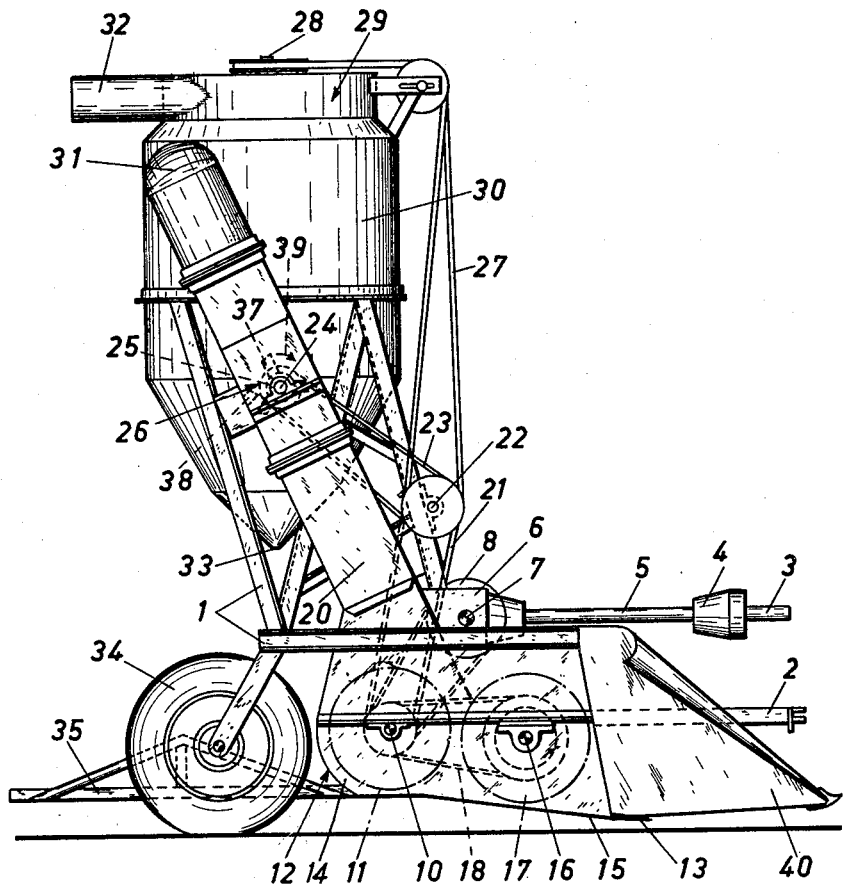
FIG. 1 is a side elevation of a harvester according to the invention for being coupled to a tractor (not shown) and provided with a so called mower knife.

The frame 1 of the harvester is provided with a draw beam 2 for being coupled to a tractor or other suitable towing vehicle. The driving force is obtained from the gear case (not shown) of the tractor via a shaft 3, a coupling 4 and a second shaft 5 to a gear case 6 on the frame 1. This gear case 6 has a driving shaft 7 carrying a belt pulley 8 which by means of a belt 9 drives the shaft 10 of a rotor 11 in a flail cutter 12 situated on one side of the frame 1. A mower type 13 is situated in front of the flail cutter 12 and comprises a knife rod which is reciprocally movable in a horizontal lateral direction and which has a row of knives for cooperating with stationary knives. Means (not shown) is provided for transmitting driving force from the shaft 10 to the mower knife 13. A feeder bottom 15 extends rearwardly from the mower knife 13 to the flail housing 14 of the flail cutter 12. The feeder bottom 15 may also comprise a belt conveyer. Between the mower knife 13 and the flail cutter 12 there is, above the bottom 15 and journalled on a shaft 16 in the frame 1, a feeding screw 17 which by means of a belt 18 is driven by the flail cutter shaft 10. The feeding screw 17 has a helical flange 19 shaped in such a way that upon rotation of the screw in one direction the material mowed by the knife 13 is conveyed from both ends of the screw towards its centre and therefrom rearwardly towards the flail cutter rotor 11. The flails of the latter catch the material and disintegrate its straw and stalks and when treating corn throw it upwardly and rearwardly through a conduit 20.

The shaft 10 carries at one of its outer ends a belt pulley from which the driving force is transmitted to an intermediary shaft 22 via a belt 21. The shaft 22 is journalled in the frame 1. The driving force is transmitted from the shaft 22 to a speed control means (not shown in the drawings) which permits a change in the rotation speed of the driving shaft. From the latter the driving force is transmitted over a belt 23 to a shaft 24 for the knife rotor 25 of a cutter 26 in the conduit 20 for further disintegrating and threshing of the harvested goods. Another belt 27 transmits the driving force from a driving shaft of the speed control means to the shaft 28 of a suction fan 29 at the upper end of a cyclone separator 30 which has a vertical shaft and is carried on the frame 1. The conduit 20 extends from the flail cutter housing 14 obliquely upwards to the upper end of the separator 30 where it debouches tangentially into the separator. The upper portion of the conduits 20 comprises preferably a flexible tube 31 which can be swung away from the separator 30. The housing of the fan 29 is provided with an exhaust tube 32 for the lighter parts of the harvested goods, such as straw pieces and chaff, and the separator is at its lower end provided with an outlet for the heavier material, i.e. the grain and the like. The frame 1 is carried by wheels 34 and below the outlet 33 is provided with a platform 35 for sacks 36.

The rotor 25 of the cutter 26 is provided with axial rows of knives 37 extending in essential radial direction. At the work of the device the knives 37 pass through the spaces between grate bars 38 arranged in axial rows and extending into the conduit 20. The knife rotor is driven in the direction indicated by the arrow 39 in FIG. 1.

Figure 2:
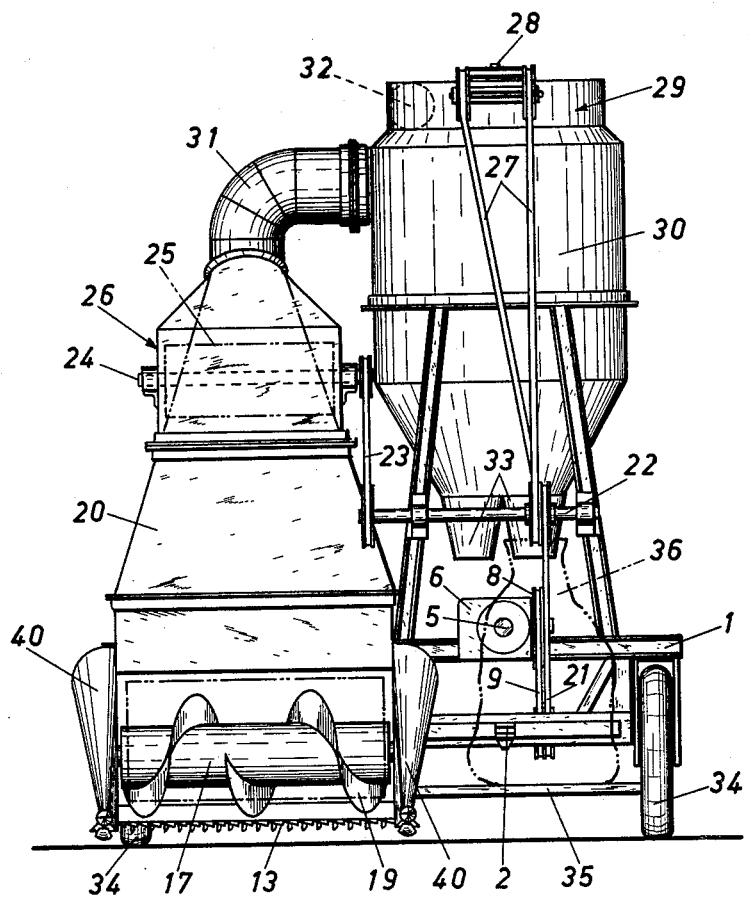
FIG. 2 is a front elevation of the harvester.

When a harvester according to FIGS. 1 and 2 is moved over a corn field, the corn is mowed between the straw dividers 40 by the mower knife 13 and caught by the feeding flange 19 of the screw 17. The screw 17 conveys the straw towards the centre of the screw and presses it rearwardly into the flail housing 14. In the flail cutter housing 14 the harvested material is caught by the flails on the rotor 11 and thrown through the conduit 20 to the cutter 26 where it is threshed and disintegrated by the rotor knives 37, the knives 38 then serving as grate bars. The harvested material thus disintegrated is fed to the separator 30 and from the latter the grains are exhausted through the outlets 33 to the sacks 36, the straw pieces and the chaff being exhausted through the outlet 32. The lighter material, i.e. the straw pieces and the chaff, may eventually be gathered on a lorry or be blown directly out on the field where it will be easily ploughed down.

The flail cutter 12 as well as the cutter device 26 serve as threshers and also as conveying means for the harvested material.

Figure 3:
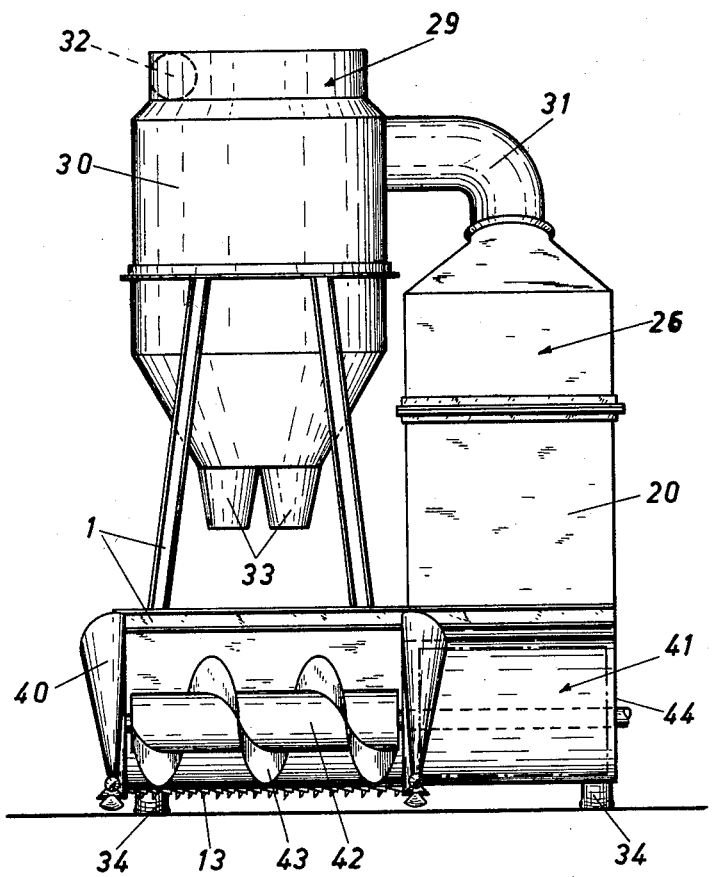
FIG. 3 is a front elevation of a modified embodiment of the harvester.

In the modification shown in FIG. 3 the flail cutter is replaced by a conveyor fan 41 and the harvested material is fed to this fan 41 by means of a horizontal driven feeding screw 42 provided with a helical flange 43 axially into the fan housing 44. The conduit 20 is connected to the outlet of the fan housing 44. The shape of the conduit 10, the cutter device 26 and the separator 30 is principally the same as the one shown in FIGS. 1 and 2.

Figure 4:
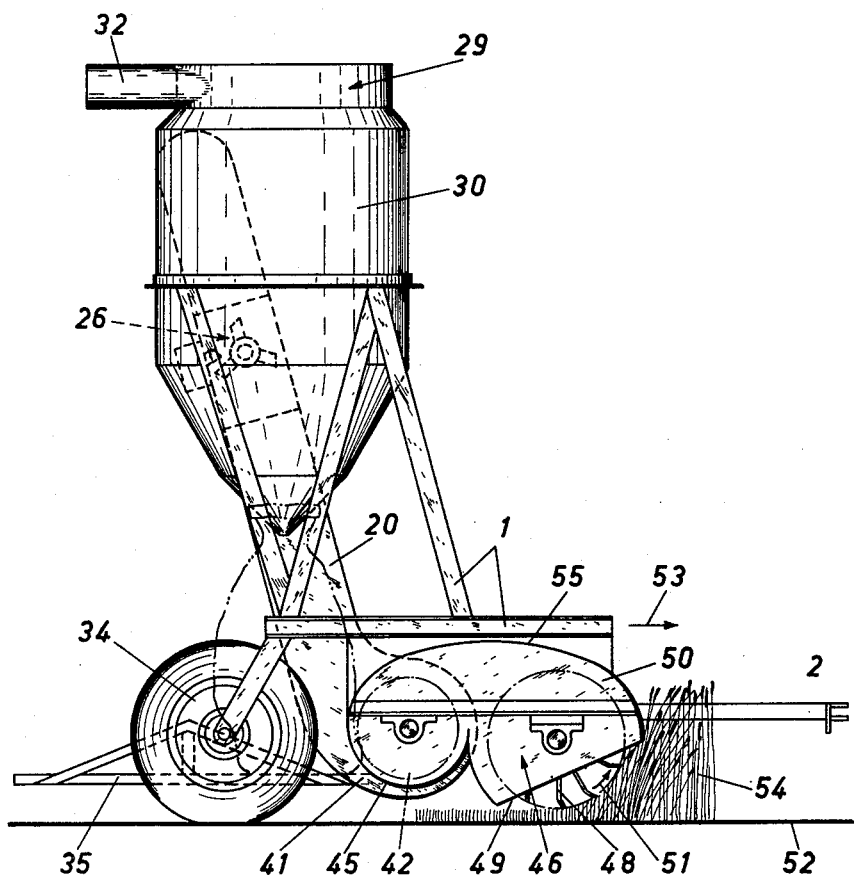
FIG. 4 is a side elevation of a further embodiment of the invention.
Figure 5:
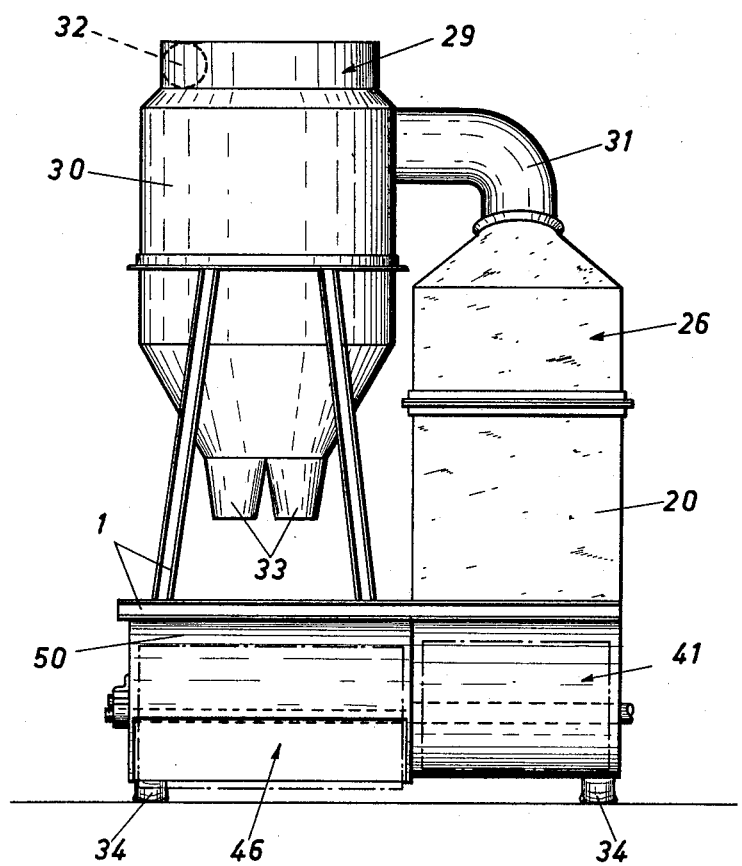
FIG. 5 is a front elevation of the harvester according to FIG. 4.

In the embodiment shown in FIGS. 4 and 5, there is also arranged a screw 42 feeding the harvested material in transverse direction into the conveying fan 41. The screw 42 rotates in a groove 45. In this embodiment the mower knife 13 is replaced by a flail cutter 46. The rotor 47 of the flail cutter is provided with flails 48 hinged to its hub and the flails 48 extend at the working of the flail cutter out through a front opening 49 in the flail cutter housing 50 and pass in the direction of the arrow 51 over the ground 52 when the harvester is moved over the ground in the direction of the arrow 53.

When the harvester in FIGS. 4 and 5 is moved over the field with corn 54 growing on it, the corn is mowed by the flails 48 which throw the harvested material guided by the screen 55 into the groove 45 where it is fed in transverse direction to the conveyor fan 41. The latter throws the harvested material up through the conduit 20 where it is disintegrated and threshed by the cutter 26. The disintegrated material is fed to the separator 30 where it is separated in the way described in the aforegoing.

Figure 6:
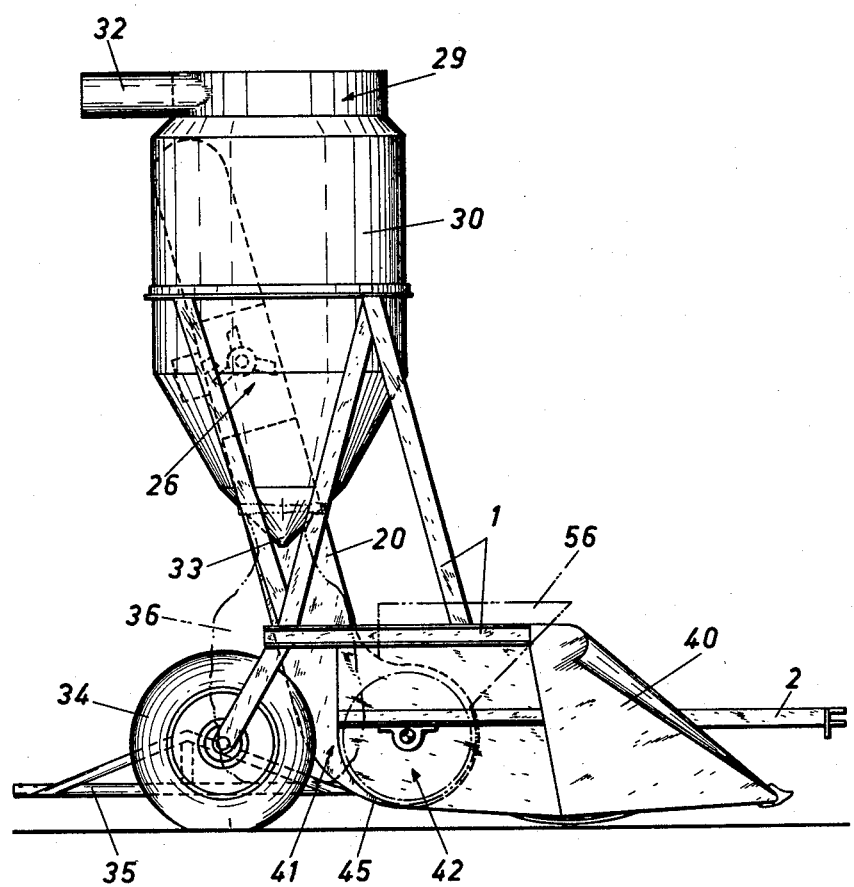
FIG. 6 is a side elevation of a harvester according to the invention converted for weeding of corn and analogous.

In the harvester according to FIGS. 4 and 5 the flail cutter 46 with the flail cutter housing 50 and the screen 55 may be removed and, as shown in FIG. 6, be replaced by a funnel 56. Also the straw dividers 40, not shown in FIGS. 4 and 5, may be removable. The harvester is now converted for weeding of corn at stationary work. The corn to be weeded is fed through the funnel 56 and conveyed by the screw 42 to the conveyor fan 41 which throws the corn upwards in the conduit 20 through the cutter 26—which in this case does not have to work but may stand still—into the separator 30 in which the lighter material, such as chaffs etc., are blown out through the outlet 32 and the weeded grain is collected in sacks 36.

The harvester according to the invention has been described in the aforegoing for purpose of illustration only and some modifications may be made in the construction and in the arrangement of the details without departing from the real spirit and purpose of my invention, and it is my intention to cover by my appended claims any modified forms of structure and use of mechanical equivalents which may be reasonably included within their scope. The modifications concern inter alia the means for transmitting the driving force to the mower knife 13, the flail rotors 11 and 47 and the feeding screws 17 and 42 with the conveyor fan 41, the knife rotor 25, and the suction fan 29.

What I claim is:

1. In a harvester, a mower comprising: a knife rod movable reciprocally in a horizontal plane and provided with a row of stationary knives for mowing a crop; a feeder bottom extending rearwardly from said knife rod; a horizontal screw conveyor journaled above said feeder bottom for conveying mowed material from both ends of the conveyor toward its center and then rearwardly, a housing disposed rearwardly of said screw conveyor for receiving mowed material from said screw conveyor, a generally cylindrical housing extending upwardly and rearwardly from said first-mentioned housing, means within said first-mentioned housing for crushing the mowed material and conveying it into said generally cylindrical housing, said crushing and conveying means including a flail rotor within said first-mentioned housing, and means within said generally cylindrical housing for disintegrating material conveyed thereto by said flail rotor, said disintegrating means including a horizontally disposed knife rotor.

2. A harvester as in claim 1 further comprising a tube extending from the upper end of said generally cylindrical housing for conveying material from said knife rotor to a load-carrying vehicle coupled to said harvester.

3. A harvester as in claim 1 further comprising a cyclone separator and a flexible tube extending from the upper end of said generally cylindrical housing and detachably connected to said separator for conveying material from said knife rotor to said separator.

References Cited by the Examiner
UNITED STATES PATENTS

| | | | |
|---|---|---|---|
| 2,529,180 | 11/50 | Oehler. | |
| 2,888,795 | 6/59 | Lundell | 56—505 X |
| 2,998,834 | 9/61 | Carlson et al. | |
| 3,035,393 | 5/62 | Mathews | 56—505 |

T. GRAHAM CRAVER, *Primary Examiner.*

ANTONIO F. GUIDA, ARNOLD RUEGG, *Examiners.*